US007941395B2

(12) United States Patent
Cassidy

(10) Patent No.: US 7,941,395 B2
(45) Date of Patent: May 10, 2011

(54) SYSTEM FOR STORING DOCUMENTS IN A REPOSITORY

(75) Inventor: James Cassidy, Phoenixville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 428 days.

(21) Appl. No.: 12/124,514

(22) Filed: May 21, 2008

(65) Prior Publication Data

US 2009/0012974 A1 Jan. 8, 2009

Related U.S. Application Data

(60) Provisional application No. 60/948,251, filed on Jul. 6, 2007.

(51) Int. Cl.
*G06F 17/30* (2006.01)

(52) U.S. Cl. ........ 707/600; 707/608; 707/708; 707/755; 707/771; 707/654; 707/634; 707/805; 715/200; 715/234; 715/700

(58) Field of Classification Search ................ 707/711, 707/741, 600, 608, 708, 755, 771, 654, 634, 707/805; 715/200, 234, 700
See application file for complete search history.

(56) References Cited

U.S. PATENT DOCUMENTS

| 4,575,798 | A | * | 3/1986 | Lindstrom et al. ................ 1/1 |
| 6,438,533 | B1 | | 8/2002 | Spackman et al. |
| 6,584,459 | B1 | | 6/2003 | Chang et al. |
| 6,725,227 | B1 | | 4/2004 | Li |
| 6,795,854 | B1 | * | 9/2004 | Parker et al. ................ 709/223 |
| 6,883,137 | B1 | * | 4/2005 | Girardot et al. ............... 715/242 |
| 7,093,287 | B1 | * | 8/2006 | Gusler et al. ................... 726/13 |
| 7,797,325 | B2 | * | 9/2010 | So ................................. 707/752 |
| 2001/0049675 | A1 | * | 12/2001 | Mandler et al. ................. 707/1 |
| 2002/0069223 | A1 | * | 6/2002 | Goodisman et al. ......... 707/513 |
| 2002/0133484 | A1 | * | 9/2002 | Chau et al. ...................... 707/3 |
| 2004/0059744 | A1 | * | 3/2004 | Duncan et al. ............... 707/102 |
| 2005/0251738 | A1 | * | 11/2005 | Hirano et al. ................. 715/514 |
| 2005/0286787 | A1 | * | 12/2005 | Yagiura et al. ............... 382/239 |
| 2007/0043689 | A1 | * | 2/2007 | So ................................. 707/1 |
| 2008/0027798 | A1 | * | 1/2008 | Ramamurthi et al. ......... 705/14 |
| 2008/0222121 | A1 | * | 9/2008 | Wiessler et al. ................. 707/4 |
| 2008/0263006 | A1 | * | 10/2008 | Wolber et al. .................... 707/3 |

* cited by examiner

*Primary Examiner* — Frantz Coby

(74) *Attorney, Agent, or Firm* — Alexander J Burke

(57) ABSTRACT

A system stores documents in a repository and includes a repository for storing data representing a document. An interface processor receives and stores document data representing a first document and an associated document identifier. A document processor automatically parses and processes the received document data to identify and store data indicating: (a) internal document structure and characteristics, and (b) external document relationships. The internal document structure and characteristics include a compilation of searchable keywords and key values. The external document relationships include an association or hierarchical relationship between the first document and one or more different documents.

21 Claims, 2 Drawing Sheets

SYSTEM FOR STORING DOCUMENTS IN A REPOSITORY

This is a non-provisional application of provisional application Ser. No. 60/948,251 filed Jul. 6, 2007, by J. Cassidy.

FIELD OF THE INVENTION

The present invention relates to a system for storing documents in a repository. More specifically, the system provides for interrelating documents in the repository, in particular for generating relationships among XML documents.

BACKGROUND OF THE INVENTION

Storing data in XML form provides a flexible data storage, classification and retrieval alternative to the rigid table/column specifications maintained in a relational database. Known systems can store documents, in particular XML documents, in a repository such as a computer storage system. Such systems support searching and retrieval of those documents based on their content. These systems require specific program code tied to each instance of an XML schema and corresponding relational database tables and row and column definitions to handle the equivalent features. Development and maintenance, coding and testing times for providing these features in known systems is represent a substantial burden, and often requires a developer to have both technical database expertise as well as XML content domain expertise. In addition, should the XML schema change or be augmented, a change in the relational database tables and associated program code may be required, with its associated development burden. Although some database vendors provide for storing XML data, this data is typically unable to participate in some basic data management features provided for table/column data.

A system for storing documents in a repository which can provide interrelationships among documents without requiring generation of specific program code and/or relational database table design and development is desirable.

BRIEF SUMMARY OF THE INVENTION

In accordance with principles of the present invention, a system for storing documents in a repository, includes an interface processor for receiving and storing document data representing a first document and an associated document identifier. A document processor automatically parses and processes the received document data to identify and store data indicating: (a) internal document structure and characteristics, and (b) external document relationships. The internal document structure and characteristics include a compilation of searchable keywords and key values. The external document relationships include an association or hierarchical relationship between the first document and one or more different documents.

Such a system provides for the storage of documents in a repository while providing search capabilities based on keywords associated with the documents and relationships with other documents. The system does not require additional programming and testing when other documents, keywords and/or relationships are added. More specifically, the system extends a relational database management system to provide referential integrity (user defined relationships between XML documents) and indexing (unique and non-unique) to XML data. These extensions are dynamic in nature, based on content within XML documents and do not require administration functions to utilize.

More specifically such a system includes features listed below. These features provide the appropriate effect across insert, update and delete operations on the XML data.
1. Storage of XML Documents
2. History of all changes to XML Documents
3. One or more unique indices of user specified values
4. Zero or more non-Unique indices of user specified values
5. Indexing and integrity support for user specified relationships between XML Documents; and
6. History of all changes to relationships between XML Documents Although access may typically be through normal SQL statements, the system also provides functions to perform more complex query operations.

DETAILED DESCRIPTION OF THE INVENTION

Figure 1:
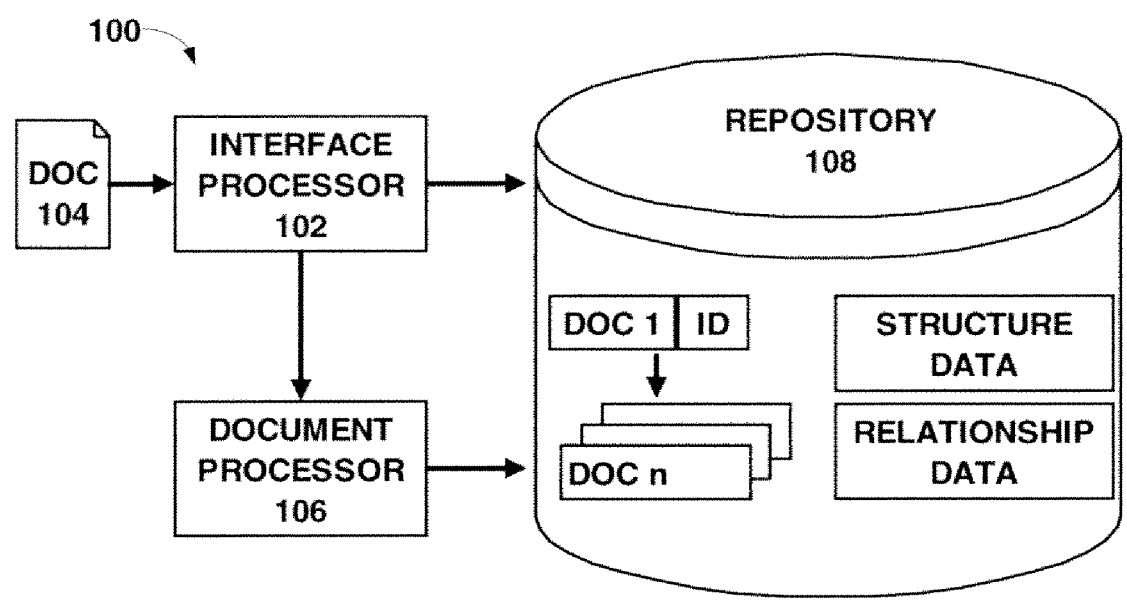
FIG. 1 is a block diagram of a system for storing documents in a repository according to principles of the present invention.

A processor, as used herein, operates under the control of an executable application to (a) receive information from an input information device, (b) process the information by manipulating, analyzing, modifying, converting and/or transmitting the information, and/or (c) route the information to an output information device. A processor may use, or comprise the capabilities of, a controller or microprocessor, for example. The processor may operate with a display processor or generator. A display processor or generator is a known element for generating signals representing display images or portions thereof. A processor may be electrically coupled to any other processor enabling interaction and/or communication there-between. A processor and a display processor comprises any combination of, hardware, firmware, and/or software.

An executable application, as used herein, comprises code or machine readable instructions for conditioning the processor to implement predetermined functions, such as those of an operating system, system for storing documents in a repository or other information processing system, for example, in response to user command or input. An executable procedure is a segment of code or machine readable instruction, subroutine, or other distinct section of code or portion of an executable application for performing one or more particular processes. These processes may include receiving input data and/or parameters, performing operations on received input data and/or performing functions in response to received input parameters, and providing resulting output data and/or parameters.

A user interface (UI), as used herein, comprises one or more display images, generated by the display processor under the control of the processor. The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to the processor. The processor, under control of the executable procedure or executable application manipulates the UI display images in response to the signals received from the input devices. In this way, the user interacts with the display image using the input devices, enabling user interaction with the processor or other device. A graphical user interface (GUI) uses graphical display images, as opposed to textual display images, when generating the UI.

A database, as used herein, comprises an executable program for storing and retrieving data in a repository. The database executable application receives and stored data in a repository, and retrieves that data in response to a query from a user. Different paradigms exist for databases: flat file databases store a plurality of records, each record consisting of a plurality of fields, each field containing data of a predetermined type. A relational database consists of a plurality of tables in which data in one table corresponds to associated data in another table. An object oriented database stores data representing objects. An object, as used herein, is a collection of executable procedures and associated data which may be accessed by other executable procedures or executable applications.

A system is implemented herein in a relational database management system through the declaration of a series of tables, views, indexes, functions, triggers and stored procedures. The system is not tied to any logical content domain; it is built to handle XML documents without regard to what schemas represent those documents. The system 100 (FIG. 1) extends a relational database management system to provide referential integrity (user defined relationships between XML documents) and indexing (unique and non-unique) to XML data. These extensions are dynamic in nature, based on content within XML documents and do not require use of particular administration functions.

FIG. 1 is a block diagram of a system 100 for storing documents in a repository according to principles of the present invention. The documents may be extensible mark up language (XML) compatible; or the documents may be mark-up language compatible and compatible with at least one of: (a) standard generalized mark-up language (SGML) and/or hypertext mark-up language (HTML). In FIG. 1, a repository 108 stores data representing documents. An interface processor 102 receives and stores document data representing first document 104 and an associated document identifier in the repository. A document processor 106 automatically parses and processes the received document 104 data to identify and store data in the repository 108. This data indicates (a) the internal document structure and characteristics; and (b) external document relationships.

The internal document structure and characteristics include a compilation of searchable keywords and key values. The internal document structure and characteristics may also include data indicating a storage history indicating the time and date of document storage and/or update. The internal document structure and characteristics include data indicating a unique name for the document, a display name for the document, and/or a keyword and associated key value related to the document. The keyword may be unique or not unique among the documents in the repository 108.

The external document relationships include an association or hierarchical relationship between the first document and one or more different documents. The external document relationships may also include data indicating the time and date of storage of data indicating a relationship or update of data indicating a relationship. The data indicating external document relationships may include data indicating a relationship to the one or more different documents in the system 100. More specifically, the data indicating a relationship to the one or more different documents may include data identifying an array of one or more different documents in the system 100; and/or data identifying the received document 104, data identifying one of the one or more different documents and data identifying the relationship between the received document 104 and the identified one of the one or more different documents. The data identifying the received document 104 and the one of the one or more different documents may include the respective document identifier, and/or unique name for the document. In addition, the data identifying the one of the one or more different documents may include a keyword and associated key value for the one of the one or more different documents.

The document processor 106 may further receive data from a user indicting (a) internal document structure and characteristics, and (b) external document relationships, and stores the data in the repository 108.

In operation, the system 100 stores documents in the repository 108 by receiving data representing a document 104. The system 100 stores the received data in the repository 108. The system further automatically parses and processes the data representing the received document to identify and store data indicating: (a) internal document structure, and (b) external document relationships wherein the internal document structure and characteristics include a compilation of searchable keywords and words accessed by a second document different from the first document and the external document relationships include an association or hierarchical relationship between the first document and a third different document.

It is also possible for the received documents 104 to include features which are not generally amenable to textual representation. Instead, such features may be represented by one or more binary data objects. In such a case, the received documents 104 include attached binary data objects representing the feature in the received document. This binary data objects are automatically processed by the document processor 106 together with the received documents 104. More specifically, the attached binary data objects in the received documents may represent graphical features in the received document 104. Such attached graphical binary data objects may include at least one of joint photographic experts group (JPEG) and/or portable document format (PDF) documents. These binary data objects are automatically processed together with the received documents in the same manner described above.

In the illustrated embodiment, the received documents 104 are XML documents. The respective documents are assigned associated Document Identifiers which are unique among the documents stored in the repository 108. The system 100 may assign a document identifier to the document automatically, or it may be supplied by a user and associated with the received document 104 by the system. Data identifying keywords and words and/or external document relationships may be specified by data within the received XML document. A received document containing data specifying keywords and words and/or external document relationships is termed herein a conforming document. A document which does not contain data specifying keywords and words and/or external document relationships is termed herein a non-conforming document.

In a conforming document, data identifying internal document structure (e.g. keywords and words), and/or external document relationships are indicated using respective XML tags and attributes included in the received document along with the other information in the document. These attributes may appear on any one or more nodes in a document. One skilled in the art understands how to enter and use such tags and attributes in an XML document.

For example, a conforming document may contain tags and attributes which operate as document identifiers. A tag <XML . . . UniqueName="XXXXXXX" . . . > indicates a unique name for a document. The tag includes an attribute "UniqueName" which is assigned a value "XXXXXXX" containing the name. The system ensures that the name is unique. The UniqueName is different from the Document Identifier (described above) associated with the document, and may provide a more human-meaningful identification of the document. The searchable keywords and words, and/or the nature of the external document relationships, may be made available in different languages if desired. A tag <XML . . . UniqueName="XXXXXXX" Lang="DE" . . . > includes an attribute "Lang" to which is assigned a value, e.g. "DE", representing the language of the unique name. This tag assigns a unique name to the document which is language specific. In the illustrated embodiment, the language is specified using a two letter code. In the illustrated embodiment the system language defaults to English allowing omission of the "Lang" attribute for English. A document may have one unique name per language. A tag <XML . . . DisplayName="XXXXXXX" . . . > assigns a display name "XXXXXXX" to the document. This is a non-unique name for a document e.g. used when the document is displayed in UIs. A display name may be language specific by specifying a language attribute: <XML . . . DisplayName="XXXXXXX" Lang="DE" . . . >. A document may have display names in many languages, however, it may have only one display name per language.

A conforming document may also contain tags and attributes which provide for indexing of that document to facilitate searching and retrieving of documents by a user. These attributes may also appear on any one or more nodes in a document. A tag <XML . . . Keyword="XXXXXXX" KeyValue="YYYYY" . . . > assigns a non-unique index to a document. The tag specifies a keyword "XXXXXXX", e.g. 'color', 'size', etc., and assigns a value "YYYYY", e.g. 'red', 'small', etc., to that keyword. The keyword and assigned value are used to generate and/or update an index for the document. Similarly, a tag <XML . . . Keyword="XXXXXXX" KeyValue="YYYYY" Uniq="Y" . . . >, including an attribute "Uniq" assigned the value "Y", assigns a unique index to a document. In this case, the "Keyword" attribute "XXXXXXX" specifies a keyword intended to contain unique values for the respective documents, e.g. 'part number'. The value "YYYYY" assigned to the keyword, e.g. 'PN 409', is different from the value of that keyword in any other document. The system will not permit a value to be assigned to a 'unique' keyword if that value has already been assigned in a document already in the repository 108. The system also prevents a keyword from being used both as a unique and a non-unique keyword within the system. A tag <XML . . . Keyword="XXXXXXX" KeyValue="YYYYY" Lang="DE" . . . > assigns an index (unique or not) which is language specific.

A conforming document may also contain tags and attributes which specify relationships between that document and other external documents. These attributes may appear on any one or more nodes in a document. A tag <XML . . . Relation="XXXXXXX" Child="YYYYY" . . . > specifies a relationship to another document in the system. The relationship may be identified by the value "XXXXXXX" of the "Relation" attribute, e.g. "references", "updates", "describes", etc. The related document is specified by entering the Document Identifier (described above) as the value "YYYYY" of the "Child" attribute. A tag <XML . . . Relation="XXXXXXX" ChildN="ZZZZZZ" . . . > also specifies a relationship to another document in the system. In this tag, the related document is specified by entering the Unique Name (also described above) of the related document as the value "ZZZZZZ" of the "ChildN" attribute. The tag <XML . . . Relation="XXXXXXX" ChildN="ZZZZZZ" Lang="DE" . . . > also specifies a relationship to another document in the system. In this tag, the related document is specified by entering the language-specific Unique Name of the related document. A tag <XML . . . Relation="XXXXXXX" KeyValue="YYYYY" Keyword="XXXXX" . . . > also specifies a relationship to another document in the system. In this tag, the related document is specified by entering an index keyword "XXXXXXX" and an index value "YYYYYY" for the keyword in the related document. In particular, the index keyword "XXXXXXX" and index value "YYYYYY" combined refer to a document with the same keyword and key value uniquely declared. A tag <XML . . . Relation="XXXXXXX" KeyValue="ZZZZZZ" Keyword="XXXXX" Lang="DE" . . . > also specifies a relationship to another document in the system using a keyword/keyvalue reference which is language specific.

A conforming document may also refer to arrays of other documents in the system. As used herein, an array of documents means an ordered list of related documents. The tags and attributes described below specify an ordered list of documents related to the current document. These attributes are placed in specific child nodes titled "C", which are within a specific node called "Children". A tag <XML . . . <Children><C cID="XXXXX"><C cID="YYYYYY"> . . . > specifies an array of references to other documents. In this tag, the "Children" node is followed by one or more child nodes "C". The child nodes "C" include an attribute "cID" to which is assigned a value of the unique Document Identifier (described above) for the referenced document. A tag <XML . . . <Children><C NM="XXXXXX"><C NM="YYYYYYY"> . . . > refers to the referenced documents via attributes "NM" to which are assigned respective Unique Name values, "XXXXXX" and "YYYYYYY" of documents in the system. A tag <XML . . . <Children><C NM="XXXXXX" Lang="DE"><C NM="YYYYYYY"> . . . > refers to the referenced documents by a language specific Unique Name.

Figure 2:
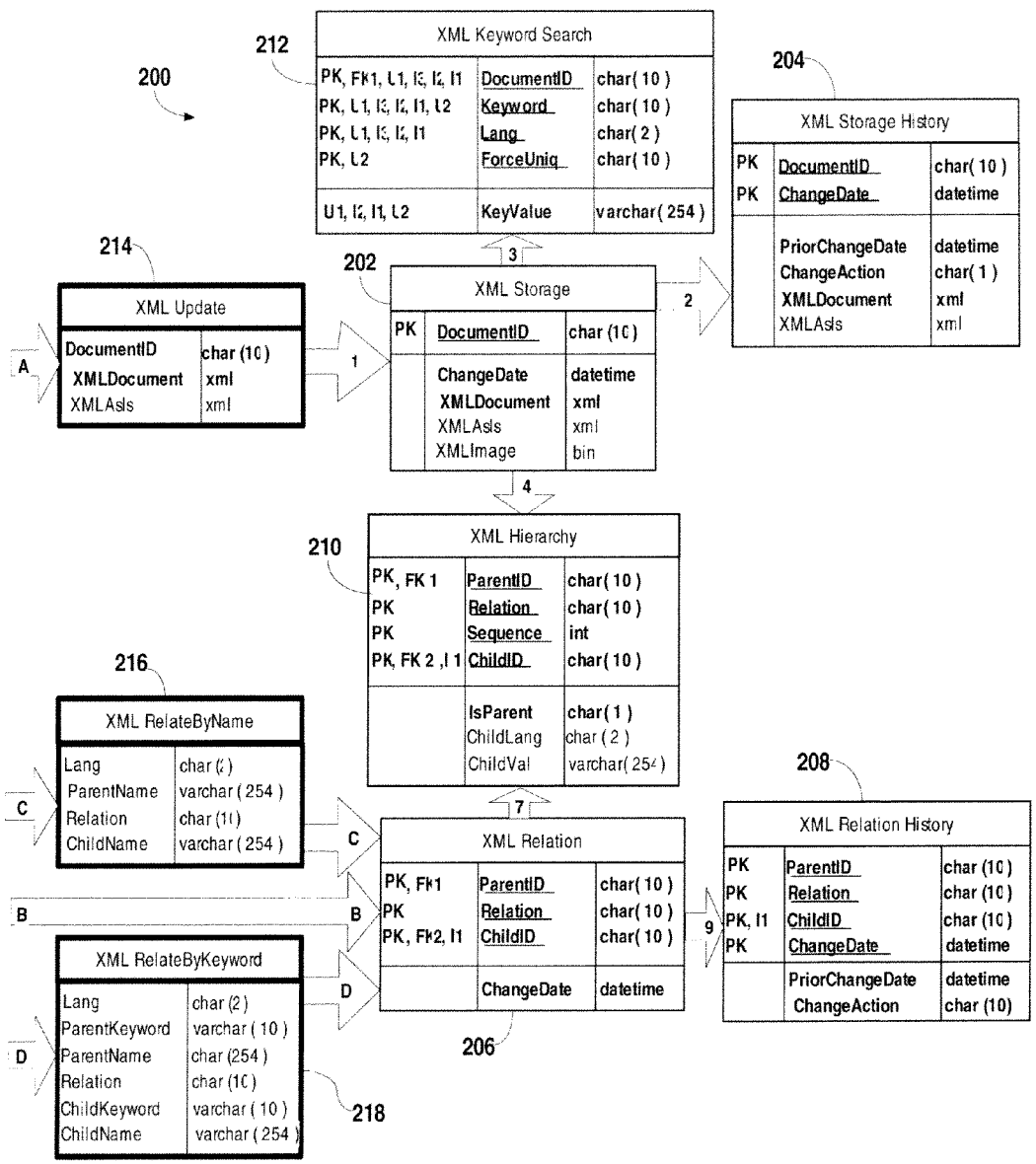
FIG. 2 is a diagram of database tables according to principles of the present invention.

As described above, the system 100 is implemented in a relational database management system. FIG. 2 is a diagram of database tables according to principles of the present invention. In FIG. 2, a database table is represented by a rectangle. The top line of the rectangle is the name of the table. Rows of information in the rectangle represent columns in the database table, and list keys and indices information in a first column, a column name in a second column, and the type of data in that column in a third column. Bolded fields are required, that is they are not permitted to contain a null value. In the first column, "PK" indicates that this column is or is a part of the primary key for the table. "FK" indicates that this column is or is part of a foreign key, that is, it contains a value which matches a corresponding primary key (or portion of the primary key) for a different database table. "In" indicates that the column is, or is a portion of, the $n^{th}$ non-unique index, and "Un" indicates that this column is, or is a portion of, the $n^{th}$ unique index, for this table. Arrows labeled with letters represent access points by a user to the data stored in the repository 108 in the system. Arrows labeled with numbers represent paths through which data is moved between tables.

In FIG. 2, the XML Storage table 202 stores the most recent version of the documents in the system. Received XML documents (104 of FIG. 1) are initially stored in this table. The table columns include: a DocumentID column which contains the Document Identifier for the document; a ChangeDate column which contains a system-assigned date and time of the most recent insert or update activity; a column for containing the XML document 104 itself. The table may also include a column XMLAsIs which may be used to contain a non-conforming XML document and a column XMLImage which may be used to contain binary data, as described above. An index on the DocumentID column is maintained for this table.

The XML Storage History table 204 stores prior versions of an XML document 104. The system maintains this table by copying contents from the XML Storage table 202 when changes or deletions occur. This table contains the same columns as the XML storage table 202 with some additional columns. The ChangeDate column indicates the system-assigned date/time when the XML document was transferred to this table. The PriorChangeDate is the system-assigned date/time of the most recent update activity prior to entry in this table, i.e. corresponding to the ChangeDate column in the XML Storage table 202. The ChangeAction column contains an indication of the reason for this entry in the XML Storage History table 204, e.g. "U" for updated, "D" for deleted, etc. An index on the combination of the DocumentID and ChangeDate columns is maintained for this table.

The XML Relation table 206 is used to store data representing relationships with external documents which are defined externally to the documents themselves. This table may be accessed directly by users to select, insert, update or delete document relationships (as described in more detail below). The XML Relation table 206 includes a ParentID column containing the DocumentID (see the XML Storage table 202) of the first document involved in this relationship; a Relation column containing data representing the type of relationship (e.g. 'defines', 'contains', 'supersedes', etc.) between the two documents; a ChildID column containing the DocumentID of the second document involved in the relationship; and a ChangeDate column containing a system-assigned date/time of the most recent activity. A first index on the combination of the ParentID, Relation, and ChildID columns, and a second index on a combination of the ParentID and Child D columns (to enable searching for parent documents of a given child document) are also maintained for table 206.

The XML Relation History table 208 is used to store prior versions of document relationships. The system maintains this table by copying contents from the XML Relation table 206 when updates and/or deletions are made to data representing relations in that table. This table contains the same columns as the XML Relation table 206 except as follows. A ChangeDate column contains the date/time the relation data was moved to this table; a PriorChangeDate column contains the value of ChangeDate from the row in the XML Relation table 206 at the time that row was moved to this table; and a ChangeAction column contains data representing a reason, e.g. "U" for update, "D" for delete, etc., why the data was transferred to this table from the XML Relation table 206. A first index on the combination of ParentID, Classification, Child D and ChangeDate columns, and a second index on a combination of the ParentID and Child D columns (to enable searching for documents that were parent documents of a given document at some point in the past) are also maintained for table 208.

The XML Hierarchy table 210 is used to support parent/child relationships between XML documents. The system maintains this table through stored executable procedures and/or functions. The XML Hierarchy table 210 includes a ParentID column containing the DocumentID of the parent XML document; a Relation column containing data representing the type of relationship between the parent and child documents, e.g. "describes", "contains", 'is-a', 'has', "is-part-of", etc.; a Sequence column containing data representing the order of children; a ChildID column containing the DocumentID of the child XML document; and an IsParent column containing data which indicates that the 'child' document represented by the data in this row is also a 'parent' document in another relationship with the same Relation value. A first index is maintained on a combination of the ParentID, Relation, Sequence and ChildID columns. When the 'Child' is a literal (ChildVal is valued), ChildID is set to ParentID. A second index is maintained on ChildID and is used to check to make sure that when a document is being deleted, it is not a child in a relationship defined in a different XML document. Standard database referential integrity foreign keys are defined to maintain the relationship between entries in this table and the XML Storage table 202. These are typically maintained by the database management system.

Regarding the Sequence column, in a situation where a parent document is related to more than one child document (termed a many-to-one relationship) the children are maintained in the order they were specified in the parent document. The Sequence column maintains this order. Regarding the IsParent column, this field is used internally by the system to reduce the amount of work needed to search for and maintain the hierarchical relationships.

Two additional columns may be included in the XML Hierarchy table 210. A ChildLang column containing data representing the language of the document identified by data in the ChildID column and a ChildVal column contains data (two letter country ID code in the illustrated embodiment) representing a language specific value for the child. These columns are also used if literals may be specified as children of an XML document. Use of literal values is not germane to the present invention, and is not described in detail.

The XML Keyword Search table 212 is used to store index content information extracted from XML documents. The XML Keyword Search table 212 includes a DocumentID column used to contain the unique key of the XML Document; a Keyword column used to contain data representing the keyword, e.g. "color", "part number", etc., used to qualify the search key value; a ForceUnique column contains data identifying if the keyword is unique. If the keyword contains unique values, this column is blank. For non-unique indexes, this field contains the DocumentID, thereby enabling unique and non-unique keyword indexes to share the XML Keyword Search table 212. A Lang column is used to contain a 2 character language code for the KeyValue. A KeyValue column contains the value of the keyword to be indexed.

Multiple indices are maintained for this table. A first index is maintained on a combination of the DocumentID, Keyword and ForceUnique columns and is used to control updates to this table. A second index is maintained on a combination of the KeyValue, Keyword, Lang and DocumentID columns and is used to aid searches by key value combinations. A third index is maintained on a combination of the DocumentID, Keyword, Lang and KeyValue columns and is used to aid listing specific values from a document when a document list is returned. A fourth index is maintained on a combination of the Keyword, KeyValue, Lang and DocumentID columns and is used to support browsing and/or forming lists of XML documents by Keyword. A fifth index is maintained on a combination of the DocumentID, Keyword, and Lang columns and is used to prevent adding a document specifying two values for the same Keyword/Language combination within an XML document, one with Unique specified and one not. A sixth index is maintained on a combination of the KeyValue, Keyword and ForceUniq columns and is used to enforce uniqueness for a KeyValue/Keyword combination. When a combination is declared to be unique, ForceUnique is empty, when non-unique; it contains the DocumentID; thus enabling the database management system to enforce the combination's uniqueness.

In operation, referring again to FIG. 1, when a document 104 is received, it is scanned by the interface processor 102 to determine if it is a conforming document: that is if tags described above are present in the document. If the document is a non-conforming document, that is if no tags described above are present, then it is processed as a non-conforming document in a manner described in more detail below. However, if the document is a conforming document, it is scanned by the interface processor 102, and the tags (described above) associated with the document are extracted from the document. The database management executable application in the system 100 stores the document 104 (DOC1) and the associated document identifier (ID) in the XML Storage table 202 (FIG. 2) in the repository 108.

The document processor 106, then automatically parses and extracts data represented by other tags in the document 104. The internal document structure and characteristics of the document 104 relate to document identification and indexing and are represented by the values assigned to the unique name, display name and associated language attributes, and the values assigned to the KeyWord/KeyValue, and associated language and unique attributes. The external document relationships relate to relationships between the document 104 and other documents in the system 100 and are represented by the values assigned to the relation and child, childN, cID, and keyword/keyvalue and associated language attributes. This data is stored in the appropriate tables in the database (FIG. 2) by the database management executable application in a manner described in more detail below.

In an embodiment, system 100 may be implemented in a database management executable application implementing a structured query language (SQL) interface. More specifically, the database management system includes the capability for views, triggers, indices, functions and stored procedures. One such database management executable application is the Microsoft SQL Server 2005®.

A database view, as used herein, refers to a virtual or logical table composed of the result set of a query or other similar database access. Unlike ordinary database tables (e.g. 202-212) in a relational database, a view is not part of the tables in the repository 108. Instead it is a dynamic, virtual table computed and/or collated from data in the ordinary database tables (e.g. 202-212). Views are represented in FIG. 2 as rectangles with thick borders. Because views are virtual tables, the contents of the rectangles in FIG. 2 representing views are the same as those representing tables. In the illustrated embodiment, a database view operates on a subset of columns from one or more database tables to enable the user to concentrate on important data while maintaining other data, e.g. ChangeDate, PriorChangeDate, internally, without user intervention.

A database trigger, as used herein, refers to an executable procedure that is automatically executed, or 'fired', by the database management executable application in response to the occurrence of certain events related to a specified table in a database. There are typically three triggering events that cause triggers to 'fire': an INSERT event (i.e. as a new record is inserted into the database); an UPDATE event (i.e. as a record is changed); and a DELETE event (i.e. as a record is deleted). As used herein, triggers operate once per INSERT, UPDATE, or DELETE statement. In addition, there are "BEFORE triggers" and "AFTER triggers" which specify the time of execution of the trigger with respect to the occurrence of the triggering event, e.g. BEFORE INSERT, AFTER DELETE, etc. There is also an "INSTEAD OF trigger" which is a trigger that will execute instead of the triggering SQL statement.

In the embodiment illustrated in FIG. 2, there are four access points for users to update the database; they are illustrated as broad arrows in FIG. 2 lettered A through D. These access points operate as described in more detail below. In particular, access points A, C and D use respective database views to interface with the database. More specifically, access point A is accessed by a user to insert or update an XML document. In view 214, the columns DocumentID, XML-Document and XMLAsIs from the XML Storage table 202 are made available to the user. The view 214 may be accessed by a user to perform an insert, update or delete operation on a row in the view, i.e. to insert, update or delete data representing an XML document 104. The user generates an SQL statement to perform the insertion, update or deletion of the XML document 104. The method of generating the SQL statement is not germane to the present invention and is not described in detail. One skilled in the art understands the ways in which a user may generate an appropriate SQL statement, e.g. directly as a textual SQL statement, using a GUI to generate an SQL statement, etc.

In the illustrated embodiment, the database management executable application implements an "instead of" trigger to process the SQL statement generated as described above. Instead of inserting the XML document into the XML Storage table 202 in the repository 108 (FIG. 1), the trigger processing executable procedure scans the received XML document for tags described above. When such tags are found, they are parsed and processed to identify the value of tags representing internal document structure and external document relationships. Data in the database tables 202-212 is checked to ensure appropriate data exists in those tables. For example, when the tags in the received XML document 104 point to other documents, such a child document or hierarchical array of other documents, the trigger processing executable procedure ensures that those other XML documents exist in the database. If the tags specify unique indexing, the trigger processing executable procedure ensures that the KeyValue is unique. Further, if the user specifies an update or delete operation, the trigger processing copies the prior contents of the specified row in the XML Storage table 202 to a corresponding row in the XML StorageHistory table 204 with appropriate data in the ChangeDate column before storing the current desired contents into that row of the XML Storage table 202. For a delete operation, the data in the database is checked to determine if this document is referred to by another document in the system. If so, the delete is prevented. When all appropriate checks are made, the received XML document 104 is stored in the XMLDocument column in the XML Storage table 202 and the value of the associated document identifier (system or user generated) is stored in the DocumentID column.

Concurrently, if a KeyWord/KeyValue tag is found in the received XML document 104 (FIG. 1), the value of the KeyWord and KeyValue tags (and the values of Lang and ForceUniq tags, if present) are stored in the appropriate columns in the XML KeywordSearch table 212. Similarly, if a Relation/Child D and/or Relation/ChildN and/or Relation/KeyWord/KeyValue tag and/or a Children node is scanned in the received XML document 104, the values of the appropriate tags are stored in corresponding columns in the XML Hierarchy table 210. More specifically, if the received XML document 104 refers to another document by name (e.g. ChildN tag), the reference is recorded to maintain the integrity of that reference. That is, because the reference is recorded, the other document may not later be modified in a manner that alters the referenced name.

If the received XML document is non-conforming, that is, does not contain tags described above, it may be entered into the system 100 manually by a user using the view 214 via access point A. In this case, the user may manually create and enter a document into the XMLAsIs column in the XML Storage table 202 via the associated column in the XML Update View 214. The received document 104 may concurrently be stored in the XMLDocument column of the XML Storage table 202 via the XML Update View 214. Similarly, a DocumentID, user or system generated, is associated with the XML document.

The second access point, B, may be used to enter, maintain and/or delete relationships between XML Documents stored in the system 100 (FIG. 1) by using the DocumentID's of the two documents to be related, along with a keyword to describe the relationship. This access point may be used for non-conforming XML documents or to manually update relationships among previously entered XML documents. Access point B accesses the XML Relation table 206. For example, a user may generate an SQL statement:

"Insert into XML_Relation Values("XXXXXX", "Relation", "YYYYY")"

Where "XXXXXX" and "YYYYY" are respective DocumentIDs for the two XML documents to be related, and "Relation" describes the desired relation (e.g. 'is-a', 'is-part-of', 'cousin', etc.).

The database management executable application displays a GUI allowing data entry for the XML Relation table 206. In this way, a user may enter the DocumentID of the parent document, the Document ID of the child document and data in the Relation column representing the relationship between them. If the relationship is deleted, a "Delete" trigger executable procedure on the XML Relation table 206 copies the prior contents of the specified row from the XML Relation table 206 to the XML RelationHistory table 208. The data described above representing a relationship is also copied to the XML Hierarchy table 210 so that they can be queried in conjunction with the parent/child relationships that are extracted from conforming documents saved in the XMLDocument column of the XML Storage table 202.

A third access point, C, may be used to enter, maintain and/or delete relationships between XML documents stored in the system 100 (FIG. 1) by using their unique names. Access point C may be used for non-conforming XML documents or to manually update relationships between previously entered XML documents. Access point C uses an XML RelateByName database view 216. A user accesses the database view 216 to enter, modify or delete relationship data. For example, a user may generate an SQL statement:

Insert into XML_RelateByName Values("Lang", "XXXXXX", "Relation", "XXXXXX")

Where "XXXXXX" and "XXXXXX" are respective Unique Names of XML documents in the system, "Lang" is the language of the unique name (if included), and "Relation" is the desired relation (e.g. 'is-a', 'is-part-of', 'cousin', etc.). The database management executable application implements an "instead of" trigger executable procedure on the XML RelateByName view 216. When the database view 216 is accessed, the "instead of" trigger executable procedure resolves the mapping from unique name to DocumentID for the two XML documents to be related, then performs the database activity to the XML Relation table 206 in the same manner as access point B, described above.

A fourth access point, D, may be used to enter, maintain and/or delete relationships between XML documents stored in the system 100 (FIG. 1) by using one or more of the unique indices which may be defined for the documents. Access point D may be used for non-conforming XML documents or to manually update relationships between previously entered XML documents. Access point D uses an XML RelateByKeyword database view 218 to enter, modify or delete relationship data. For example, a user may generate an SQL statement:

Insert into XML_RelateByKeyword Values("Lang", "AAAAA", "XXXXXX", "Relation", "BBBBB", "YYYYY")

Where "XXXXXX" and "YYYYY" are respective unique index values for the XML documents to be related, "AAAAA" and "BBBBB" are the respective keywords relating to those XML documents, "Lang" is the language of the index values for the respective XML documents and "Relation" is the desired relation (e.g. 'is-a', 'is-part-of', 'cousin', etc.).

The database management executable application implements an "instead of" trigger on the XML_RelateByName table 218. The "instead of" trigger executable procedure resolves the mapping from Keyword/Keyvalue to DocumentID for the two XML documents to be related, then performs the database activity to the XML Relation table 206 in the same manner as access point B, described above.

Data entered into the system as described above, may be accessed by a user to retrieve desired XML documents and/or associated data. One skilled in the art understands that SQL statements may be generated to search for and retrieve data from the repository 108 (FIG. 1). The database management executable application is able to accept and process such SQL statements, retrieve the data specified by such statements, and provide that data to the user. One skilled in the art further understands that Uis and in particular GUIs may be provided to display the retrieved data in a format which is useful to the user. For example, a GUI may be generated to display a desired XML document, and/or data extracted from that document, which has been searched for and retrieved. Alternatively, a list of XML documents, as represented by data within or associated with that document such as DocumentID, UniqueName, DisplayName, or other data within the document, resulting from a search may be displayed In addition to the typical capabilities of the database management executable application to access the data in the XML Storage table 202 (of FIG. 2) and the additional support tables (204-212), the system 100 also provides stored procedures and/or functions for performing tasks more specific to the data stored in the repository 108, described above. These functions return data related to one or more XML documents stored in the system.

A function to enumerate the relationships between any specified pair of documents: Relations (DocumentID1, DocumentID2) returns data representing a list of unbroken relation trees between two documents, as specified by their DocumentIDs. A relation tree, as used herein, is a list of documents which are mutually related and provide a link between the two given documents. For example, assuming that relationships among documents A, B, C and D were previously received and entered into system 100 so that "A" is-a "B" and "B" is-a "C" and C is-a "D", when requesting 'relations' between documents "A" and "D", the Relations function returns 'is-a'. This data may be used by the database management executable application to retrieve data from the repository 108 for display in a GUI for the user.

A function to enumerate and/or retrieve the parent of a document: Parent(DocumentID, Language) returns data representing a list of documents, including e.g. their respective Document IDs, Unique Names and Display Names, that contain a direct reference to, or were specifically related to the requested document, as defined by the DocumentID. The returned names are in the language requested, if the "Language" parameter is present. The result of this procedure may be used to retrieve data related to XML documents in the XML Storage table 202 designated by the data in the retuned list for display in a GUI for the user.

A function to enumerate or retrieve the Nth parents of a document: Parents(DocumentID, Language) returns data representing a list of documents, as specified by their Document IDs, Unique Names and Display Names, that are related or referenced, directly or indirectly, "up" the parent chain from the requested document, as specified by its DocumentID. The returned names are in the language requested, if present. The results of the function may be used to retrieve data related to XML documents in the XML Storage table 202 designated by the data in the returned list for display in a GUI for the user.

A function to enumerate or retrieve the children of a document. Child(DocumentID, Language) returns a list of documents, as specified by their Document IDs, Unique Names and Display Names, that are specifically referenced by, or related from the requested document, as specified by its DocumentID. The returned names are in the language requested, if present. If the children were entered as an array, the will be returned in the same order. The results of the function may be used to retrieve data related to XML documents in the XML Storage table 202 designated by the data in the returned list for display in a GUI for the user.

A function to enumerate or retrieve the Nth children of a document: Children(DocumentID, Language) returns a list of documents, as specified by their Document IDs, Unique Names and Display Names, that are related or referenced, directly or indirectly, "down" the parent chain from the requested document. The returned names are in the language requested, if present. If the children were entered as an array, they will be returned in the same order. The results of the function may be used to retrieve data related to XML documents in the XML Storage table 202 designated by the data in the returned list for display in a GUI for the user.

An SQL statement which may be used to retrieve a document by unique or non-unique, and possibly language specific, keyword values is:

```
Select DocumentID, XMLDocument from XML_Storage
    where DocumentID in (select DocumentID from
    XML_KeywordSearch
    where keyword = 'XXXXXX' and KeyValue =
    'YYYYY' and Lang = 'Z')
```

System tables provide index access to names and keywords of documents. Substituting values for 'XXXXXX', 'YYYYY' and 'Z' will return either single or multiple documents (based on the uniqueness of the KeyValue specified)

The system 100 above may be implemented in Microsoft© SQL Server 2005. Variations in the specific implementation may be used for other database vendors; For example, a code layer duplicating the system's trigger-based logic may be needed. One skilled in the art understands how to adapt the present invention for other database management system, and how to implement the necessary code layers.

What is claimed is:

1. A system for storing documents in a repository, comprising:
   a repository;
   an interface processor for receiving and storing document data representing a first document and an associated document identifier in said repository; and
   a document processor for automatically parsing and processing the received document data to identify and store data in said repository indicating:
      (a) internal document structure and characteristics, and
      (b) external document relationships comprising data indicating one or more functional types of content inter-relationship between said first document and one or more external documents different to said first document and affecting content of said first document,
   said internal document structure and characteristics comprising a compilation of searchable keywords and key values, said external document relationships comprising an association or hierarchical relationship between said first document and the one or more different external documents.

2. A system according to claim 1 wherein the document processor further receives data from a user indicating:
   (a) internal document structure and characteristics, and
   (b) external document relationships, and stores said data in said repository and
   said data in said repository indicating one or more functional types of content inter-relationship between said first document and one or more external documents indicates at least one of,
   (a) said first document content is updated by a particular external document and
   (b) said first document content is described by content of a particular external document.

3. A system according to claim 1, wherein said internal document structure and characteristics comprise data indicating a storage history indicating time and date of document storage or update and
   said data in said repository indicating one or more functional types of content inter-relationship between said first document and one or more external documents indicates at least one of,
   (a) said first document content is defined by a particular external document and
   (b) said first document content is superseded by content of a particular external document.

4. A system according to claim 1 wherein said internal document structure and characteristics comprise data indicating a unique name for said document and
   said data in said repository indicating one or more functional types of content inter-relationship between said first document and one or more external documents and also indicates a hierarchical relationship between said first document and a particular external document.

5. A system according to claim 3 wherein said internal document structure and characteristics comprise data indicating a display name for said document.

6. A system according to claim 3 wherein said internal document structure further comprises data indicating a keyword and associated key value related to the document.

7. A system according to claim 6 wherein the keyword is unique among the documents in the repository.

8. A system according to claim 6 wherein the keyword is not unique among the documents in the repository.

9. A system according to claim 1, wherein said external document relationships comprise data indicating time and date of storage of data indicating a relationship or update of data indicating a relationship.

10. A system according to claim 1, wherein
said document processor, in response to a received query, dynamically generates a virtual table comprising results of the query.

11. A system according to claim 10, wherein said data indicating a relationship to said one or more different documents comprises data identifying an array of one or more different documents in said system.

12. A system according to claim 10 wherein said data indicating a relationship to said one or more different documents comprises data identifying the received document as well as data identifying one of said one or more different documents and data identifying the relationship between said received document and said one of said one or more different documents.

13. A system according to claim 12 wherein said data identifying said received document and said data identifying said one of said one or more different documents comprises said associated document identifier.

14. A system according to claim 12 wherein said data identifying said received document and said data identifying said one of said one or more documents comprises a unique name for said document.

15. A system according to claim 12 wherein said data identifying said one of said one or more documents comprises a keyword and key value for said one of said one or more different documents.

16. A system according to claim 1, wherein said document processor, determines from said data in said repository that said first document is referred to by one or more external documents and prevents deletion of said first document.

17. A system according to claim 15 wherein said data indicating internal document structure and characteristics and external document relationships is specified in respective XML tags in the received document.

18. A system according to claim 1, wherein said documents are in markup language data format and at least one of (a) XML, (b) SGML and (c) HTML.

19. A system according to claim 1, wherein said received documents include attached binary data objects, representing a feature in the received document, automatically processed by said document processor together with said received documents.

20. A system according to claim 19, wherein said attached binary data objects comprising at least one of (a) JPEG; and (b) PDF documents automatically processed by said document processor together with said received documents.

21. A method for storing documents in a repository, comprising:
receiving data representing a document;
storing the received data in the repository;
automatically parsing and processing the data representing the received document to identify and store data indicating: (a) internal document structure, and (b) external document relationships comprising data indicating one or more functional types of content inter-relationship between said first document and one or more external documents different to said first document and affecting content of said first document, wherein the internal document structure and characteristics include a compilation of searchable keywords and words accessed by a second document different from the first document and the external document relationships include an association or hierarchical relationship between the first document and a third different document.

* * * * *